(No Model.)
L. EHRLICH.
REGISTER FOR GAS METERS.
No. 428,900. Patented May 27, 1890.
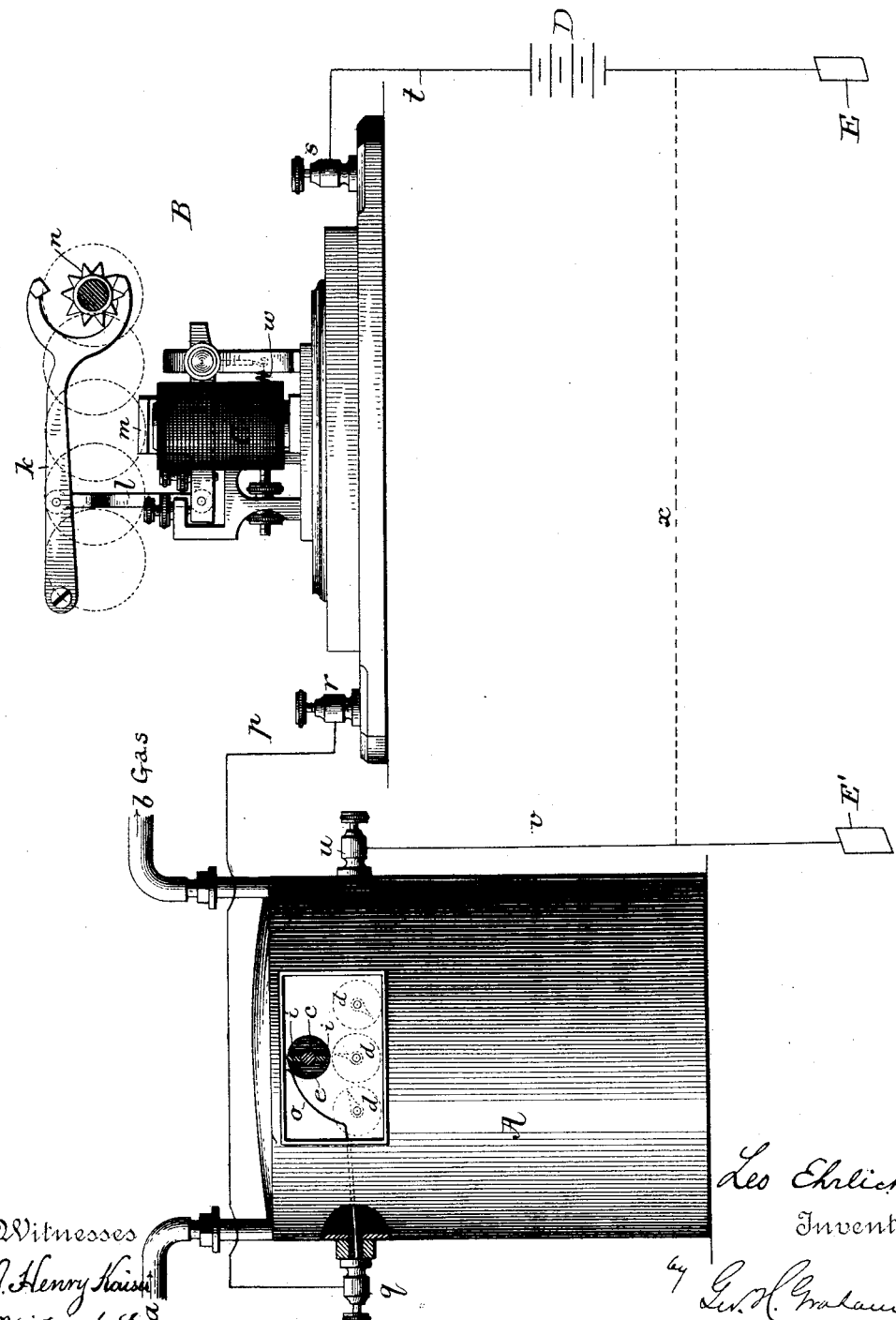
Witnesses
J. Henry Kaiser
Victor J. Evans.
Leo Ehrlich
Inventor
by Geo. H. Graham
Attorney

UNITED STATES PATENT OFFICE.

LEO EHRLICH, OF ST. LOUIS, MISSOURI.

REGISTER FOR GAS-METERS.

SPECIFICATION forming part of Letters Patent No. 428,900, dated May 27, 1890.

Application filed November 22, 1888. Serial No. 291,581. (No model.)

*To all whom it may concern:*

Be it known that I, LEO EHRLICH, a citizen of the United States, residing at the city of St. Louis, in the State of Missouri, have invented certain new and useful Improvements in Distant Registers for Gas-Meters; and I do hereby declare the following to be a full, clear, and exact description of the invention, such as will enable others skilled in the art to which it appertains to make and use the same.

The present invention relates particularly to means whereby the quantity of gas passing through a meter may be indicated or registered at a distant point; and it consists, essentially, in the combination, with a meter having a movable disk, shaft, or stud, of a distant recording, registering, or indicating device and suitable translating means between the movable disk and the distant recorder, whereby the movements of said disk, &c., are properly recorded by the distant register. Gas is now in most cities supplied to consumers, and the necessity for some convenient means of recording its consumption at some central station, obviating the required personal examination of each meter or other measuring device, has become a great desideratum, and it is to the accomplishment of this object that the present invention is directed.

It is to be understood that the invention is not limited to any particular form of gas-meter, or necessarily to the particular translating devices employed, or to the precise form of recorder shown, as it is obvious that the form of meter will vary and that the translating devices and the recorder may vary according to circumstances of their use. The latter, it may be remarked in passing, may be an ordinary dial-recorder, an indicating-hand, or a stylus recording device. With this understanding of the scope of the invention, it is illustrated in the accompanying drawing by a diagrammatic elevation, the particular devices shown being simply taken as a convenient example of one practical embodiment of the invention.

In said drawing, the measuring device A shown is an ordinary gas-meter adapted to measuring the quantity of gas consumed in a building, having the recording-dials usually employed in such meters; and it is to be observed that in using the present invention no necessity exists for disturbing or doing away with such recording-dials, a meter now in use being readily adapted, with the addition of a simple and inexpensive device for connection with the translating devices. Outside of the desirability of enabling the consumer to make his own examination of the state of the recorder, the usual recording-dials perform no function in the present invention.

The meter is provided with the usual inlet and outlet pipes $a$ $b$ and with the ordinary worm-shaft $c$, for transmitting the movement of the movable diaphragm to the recording-dials $d$. (Shown in dotted lines.) The shaft $c$, in the present instance, is a rotary one, and in order to properly transmit its rotations electrically to the distant recorder or register B said shaft is provided with an insulated disk $e$, having two metallic contacts $i$ diametrically opposed to each other, so that two contacts are made upon each revolution of the shaft $c$.

The distant register B consists of any of the well-known devices for recording or registering the movements of a reciprocating pawl-carrier or escapement-lever, and the one taken for illustration is what is commonly known as the "Geneva" escapement-recorder. Its escapement-lever $k$ is connected by a rod $l$ with the armature $m$ of a magnet C, of the usual construction, the arrangement being such that at each time the coils of the magnet become energized the armature $m$ will be caused to vibrate, and through the described connections impart a single complete vibration to the lever $k$, thus causing the escapement-wheel $n$ to be moved the desired distance necessary to the proper movement of the indicating dial or dials to record such vibration.

The electric circuit between the movable shaft $c$ of the meter and the recorder is had by means of a spring contact-arm $o$, insulated from the meter and having its free end bearing upon the insulated disk $e$ and in electric connection with a line-conductor $p$, secured through a binding-post $q$, which conductor extends to the recorder B through a binding-post $r$ in electric connection with one end of the coils of the magnet C. The other end of the coils is, through a binding-post $s$, connected by a conductor $t$ to one pole of a battery D, the other pole being connected to "ground" E. The shaft $c$ not being insulated from the metallic casing of the meter, its contacts $i$ are, through a binding-post $u$, connected by a conductor $v$ with a ground E'.

From the foregoing description it will be seen that each time one of the contacts $i$ of the shaft $c$ contacts with the arm $o$ the circuit will be closed, the magnet C thus energized, and an electric impulse will be imparted to the armature $m$, causing the lever $k$ to be rocked in one direction, and as the contact $i$ breaks connection with the arm $o$ the circuit will be broken, the armature thus permitted to resume its normal position under the force of its spring $w$, rocking the lever $k$ back to its normal position, completing a single impulse of that lever, and causing the escapement-wheel $n$ and the indicating-dial to have moved a step sufficient to record such impulse, and consequently the movement of the shaft $c$ of the measuring device or meter A.

In practice it is designed to connect each meter with a recorder located at a central station, by means of which the quantity of gas passing through the meter is registered upon the recorder at such station, thus enabling the state of all the meters connected with that station to be readily and conveniently determined without the necessity of employing traveling attendants for the purpose of a house-to-house inspection of the meters. Instead, however, of using the recorder at a central station, it might be located at some convenient place in the consumer's house, so that the necessity of examining the meter itself is obviated. So, too, the central station and the consumer may each be provided with the recorder, by means of which the "state" of the meter may at all times be readily determined.

By the term "movable shaft" it is to be understood that it is intended to cover any device, mechanical or otherwise, capable of transmitting the movement of the measuring device into electrical impulses.

While a ground-circuit only has been described, it is obvious that a metallic one, as indicated by dotted lines $x$, may be employed, if found desirable. It will also be apparent that practically the conductor $v$ will be omitted, as ground will be had through the meter and pipe connections.

What is claimed is—

A gas-meter having a rotary shaft which controls the indicating-train, provided within its case with an insulated disk having a metallic contact portion and an insulated conductor bearing upon the said disk and extending through the meter-case, in combination with an electric circuit having one terminal include the said insulated conductor and the other the metallic contact portion of the said disk and an electro-magnetic register in the said circuit distant from the meter, substantially as set forth.

In testimony whereof I have affixed my signature in presence of two witnesses.

LEO EHRLICH.

Witnesses:
HORTON POPE,
KATIE O'MALLEY.